US012812344B2

(12) United States Patent
Knott et al.

(10) Patent No.: US 12,812,344 B2
(45) Date of Patent: Nov. 24, 2026

(54) CONTROLLING A SECURITY FUNCTION OF A MOTOR VEHICLE

(71) Applicant: Bayerische Motoren Werke Aktiengesellschaft, Munich (DE)

(72) Inventors: Thorsten Knott, Tuntenhausen (DE); Alaa Mourad, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/884,375

(22) Filed: Sep. 13, 2024

(65) Prior Publication Data

US 2025/0126448 A1 Apr. 17, 2025

(30) Foreign Application Priority Data

Oct. 13, 2023 (DE) ..................... 10 2023 128 020.1

(51) Int. Cl.
*B60R 25/24* (2013.01)
*H04W 4/80* (2018.01)

(52) U.S. Cl.
CPC ............. *H04W 4/80* (2018.02); *B60R 25/245* (2013.01); *B60R 2325/101* (2013.01); *B60R 2325/108* (2013.01)

(58) Field of Classification Search
CPC .. B60R 25/24; B60R 25/245; B60R 2325/101
See application file for complete search history.

(56) References Cited

U.S. PATENT DOCUMENTS

| | | | | |
|---|---|---|---|---|
| 2017/0230810 | A1 | 8/2017 | Banerjea | |
| 2019/0006891 | A1* | 1/2019 | Park | H02J 50/90 |
| 2019/0193681 | A1* | 6/2019 | Ito | B60R 25/246 |
| 2022/0279324 | A1 | 9/2022 | Mourad | |

FOREIGN PATENT DOCUMENTS

KR 10-2023-0061965 A 5/2023

OTHER PUBLICATIONS

"Car Connectivity Consortium Digital Key Release 3", Technical Specification, Version 1.1.0 (CCC-TS-101), Jul. 20, 2022, pages 1-496 with errata documents No. CCC-MS-002 and no. CCC-MS-004 (528 pages)
German-language Search Report issued in German Application No. 10 2023 128 020.1 dated Jul. 4, 2024 with partial English translation (13 pages).

* cited by examiner

*Primary Examiner* — Anshul Sood
(74) *Attorney, Agent, or Firm* — Crowell & Moring LLP

(57) ABSTRACT

A method for controlling a security function of a motor vehicle includes the steps of making a communication connection between the motor vehicle and a mobile device via Bluetooth Low Energy Long Range; determining a distance between the motor vehicle and the mobile device via channel sounding on the communication connection; and changing the communication connection to Bluetooth Low Energy Normal Mode when the distance is below a predetermined threshold.

19 Claims, 2 Drawing Sheets

CONTROLLING A SECURITY FUNCTION OF A MOTOR VEHICLE

CROSS REFERENCE TO RELATED APPLICATION

This application claims priority under 35 U.S.C. § 119 from German Patent Application No. 10 2023 128 020.1, filed Oct. 13, 2023, the entire disclosure of which is herein expressly incorporated by reference.

BACKGROUND AND SUMMARY

The present invention relates to the control of a security function of a motor vehicle. In particular, the present invention relates to the wireless control of a security function.

A motor vehicle comprises a security function that can decide whether a person is able to open or use the motor vehicle. Use normally comprises moving or driving the motor vehicle. The security function can be controlled using, by way of example, a concept that is known by the name Digital Car Key. The Digital Car Key (DCK) is a standardized solution whose documentation is disclosed by the Car Connectivity Consortium. At present, Digital Key Technical Specification Release 3 is available in version 1.1.0 dated Jul. 20, 2022. A digital key is stored on a mobile device, in particular a smartphone, of a user. When the user with the mobile device approaches the motor vehicle, a Bluetooth Low Energy (BLE) connection between the two devices can be made that can be used to carry out a cryptographic key exchange. A key stored on the mobile device can have predetermined associated security functions that can subsequently be performed by the user.

A communication between the motor vehicle and the mobile device by means of BLE is restricted in its range. Under optimum conditions, a communication range can be several hundred meters. As a rule, however, optimum conditions do not exist, and objects in the region of the motor vehicle or the mobile device can shade or reflect transmitted radio waves. A usable communication range between the devices may be significantly reduced as a result. This means that setup of the communication connection while the person with the mobile device is approaching the motor vehicle can be delayed to the extent that the person reaches the motor vehicle without a complete authentication having taken place. In this case, the person is unable to use the motor vehicle and must wait until the necessary data interchange between the mobile device and the motor vehicle has taken place.

To comply with the BLE standard and due to legal restrictions, a transmission power cannot be increased in order to extend the communication distance. However, version 5 of the BLE standard has provided the option of operating a BLE interface either in a known normal mode (Normal Mode) or in a mode with extended range (Long Range Mode). In Long Range Mode, correction data are predictively added to the data to be relayed (forward error correction), with the result that losses at the receiver that have arisen on the transmission link can be compensated for by way of correction. In practice, BLE in Long Range Mode can achieve approximately twice the communication range compared with BLE in Normal Mode. However, an available bandwidth of the BLE connection is limited on account of the added error correction information. Whereas a transmission speed of approximately 1 Mbit/s is customary in Normal Mode, a bandwidth of approximately 125 Kb/s can apply in Long Range Mode. Certain applications requiring a communication connection between the mobile device and the motor vehicle can require a greater bandwidth than 125 Kb/s, however.

One object on which the present invention is based is therefore that of providing an improved technique for controlling a security function of a motor vehicle by way of a BLE connection. The invention achieves this object by means of the subjects of the independent claims. Dependent claims describe preferred embodiments.

According to a first aspect of the present invention, a method for controlling a security function of a motor vehicle comprises steps of making a communication connection between the motor vehicle and a mobile device by means of Bluetooth Low Energy Long Range; determining a distance between the motor vehicle and the mobile device by means of channel sounding on the communication connection; and changing the communication connection to Bluetooth Low Energy Normal Mode if the distance is below a predetermined threshold.

As a result, a bandwidth that can be used for communication between the motor vehicle and the mobile device can, in an improved manner, be raised when an increased range is not necessary. The communication connection between the mobile device and the motor vehicle can advantageously be set up over a relatively great distance, with the result that as the mobile device approaches the motor vehicle it is possible for data to be interchanged at an early stage. In particular, the motor vehicle can be prepared for the arrival of a person with the mobile device at an early stage.

The security function can control whether or in what way the motor vehicle can be used. The security function can, in particular, comprise an entry function that comprises opening or closing a door or hatch. Furthermore, the security function can comprise use of the motor vehicle for the purposes of a vehicle function. By way of example, security for driving the motor vehicle or starting a drive machine may be provided by the security function.

It is preferred for the security function to be controlled on the basis of the communication connection of the motor vehicle. In particular, it is possible to determine whether a permission to perform a predetermined security function is available. If this is not the case, performance of the security function can be denied. Opening or getting into the motor vehicle or driving the motor vehicle can be prevented.

Preferably, a bilateral authentication takes place on the basis of an asymmetric cryptographic method. The security function can be performed only when it has been possible to authenticate both the motor vehicle to the mobile device and the mobile device to the motor vehicle. To this end, the motor vehicle and the mobile device can each have a cryptographic key comprising a public part and a private part. An authentication can take place in particular by means of a challenge-response method. The authentication can exploit the circumstance that a message that has been encrypted by means of a public key of one party can be decrypted only using the private key. In a corresponding manner, a message that has been encrypted using the private key can be decrypted only using the public key.

A digital key stored on the mobile device may be associated with a person with whom the mobile device is associated. In order to use the digital key, and in particular the private part thereof, a user can be prompted to authenticate themselves to the mobile device. To this end, the user can input a predetermined secret into the mobile device or demonstrate a biometric feature, for example. In this way, performance of the security function can be tied to a person whose mobile device stores an appropriate digital key.

It is particularly preferred for the security function to be controlled on the basis of a Digital Car Key. The Digital Car Key can follow the applicable standard, and a multiplicity of different digital vehicle keys (Digital Car Key, DCK) may exist for a motor vehicle. A digital vehicle key may have one or more associated security functions that can be controlled by means of the vehicle key.

In a more preferred embodiment, a further vehicle function of the motor vehicle is additionally controlled. The further vehicle function can comprise any function of the motor vehicle in practice. The vehicle function can differ from a security function described herein in that the security function must be performed before the vehicle function can be performed. The vehicle function is normally associated neither with the control of access to the motor vehicle nor with ordinary driving operation. By way of example, the vehicle function can comprise the control of an automatic parking process of the motor vehicle. Another illustrative vehicle function can relate to coupling the mobile device to an input or output apparatus aboard the motor vehicle. Furthermore, information can be aligned between the motor vehicle and the mobile device, for example an address book or a calendar.

In an extension of the present invention, the communication connection can be changed back to Bluetooth Low Energy Long Range if an error rate of the Bluetooth Low Energy Normal Mode connection exceeds a predetermined threshold. It is thus possible to prevent changeover from BLE LR to BLE Normal from resulting in an already established communication connection being lost. It is also possible to change back to BLE LR if, following the change to Normal Mode, fewer data than a predetermined volume can be transmitted over a predetermined time. Switching back can also occur if no data at all can be relayed following the activation of Normal Mode.

After the switch back to BLE LR Mode, the threshold for the distance can be decreased. A fresh attempt to change over the communication connection to Normal Mode can thus be made only when the distance between the mobile device and the motor vehicle has accordingly been decreased. The distance can be decreased by a predetermined amount, for example approximately 10 m, or by a predetermined proportion, for example approximately 10%. It should be noted that an applicable decrease can also take place repeatedly if changeover from BLE LR Mode to Normal Mode is repeatedly unsuccessful.

Changeover between BLE LR and BLE in Normal Mode can be controlled by both devices in principle. In a first variant of the present method, the distance is determined by the motor vehicle, and a request to change the connection to BLE Normal Mode is relayed from the motor vehicle to the mobile device. The mobile device can comply with the request, and the communication connection can be changed over to Normal Mode. In this way, the method can be carried out by means of an ordinary mobile device in combination with an adapted motor vehicle.

In a second variant, the distance is determined by the mobile device; a request to change the connection to BLE in Normal Mode being relayed from the mobile device to the motor vehicle. In a corresponding manner, the motor vehicle can comply with the request, and so the communication connection is put into Normal Mode. This variant of the method can be carried out by means of an ordinary motor vehicle in combination with an adapted mobile device.

The devices participating in the communication connection comprise the mobile device and the motor vehicle. In another embodiment of the present method, a request from one of the devices to change the connection to BLE Normal Mode can be denied by the other device if the determined distance exceeds the predetermined threshold. By way of example, the motor vehicle can determine that the distance exceeds the predetermined threshold and a request from the mobile device to continue the communication connection by means of BLE in Normal Mode can be denied by the motor vehicle. A converse embodiment in which the mobile device determines the distance is likewise possible.

According to another aspect of the present invention, a control apparatus for controlling a vehicle function of a motor vehicle comprises a Bluetooth Low Energy interface; and a processing device. The processing device is conditioned to configure the interface to Bluetooth Low Energy Long Range; to use the interface to make a communication connection to a mobile device; to determine a distance between the motor vehicle and the mobile device by means of channel sounding on the communication connection; and to change the communication connection to Bluetooth Low Energy in Normal Mode if the distance is below a predetermined threshold.

The control apparatus may, in particular, be mounted aboard a motor vehicle. In a method described herein, a motor vehicle can use the control apparatus to act. The processing device is preferably conditioned to carry out some or all of a method described herein. To this end, the processing device may be electronic and comprise, by way of example, an integrated circuit, a programmable logic chip or a programmable microcomputer. The method may be realized in the form of a configuration or as a computer program product containing program code means for the processing device. The configuration or the computer program product may be stored on a computer-readable data carrier. Features or advantages of the method can apply to the apparatus, or vice versa.

According to yet another aspect of the present invention, a motor vehicle comprises a control apparatus described herein. The motor vehicle can comprise, in particular, a passenger vehicle, a motorcycle, a truck or a bus.

According to another aspect of the present invention still, a mobile device for controlling a vehicle function of a motor vehicle comprises a Bluetooth Low Energy interface; and a processing device. The processing device is conditioned to configure the interface to Bluetooth Low Energy Long Range; to use the interface to make a communication connection to the motor vehicle; to determine a distance between the mobile device and the motor vehicle by means of channel sounding on the communication connection; and to change the communication connection to Bluetooth Low Energy in Normal Mode if the distance is below a predetermined threshold.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
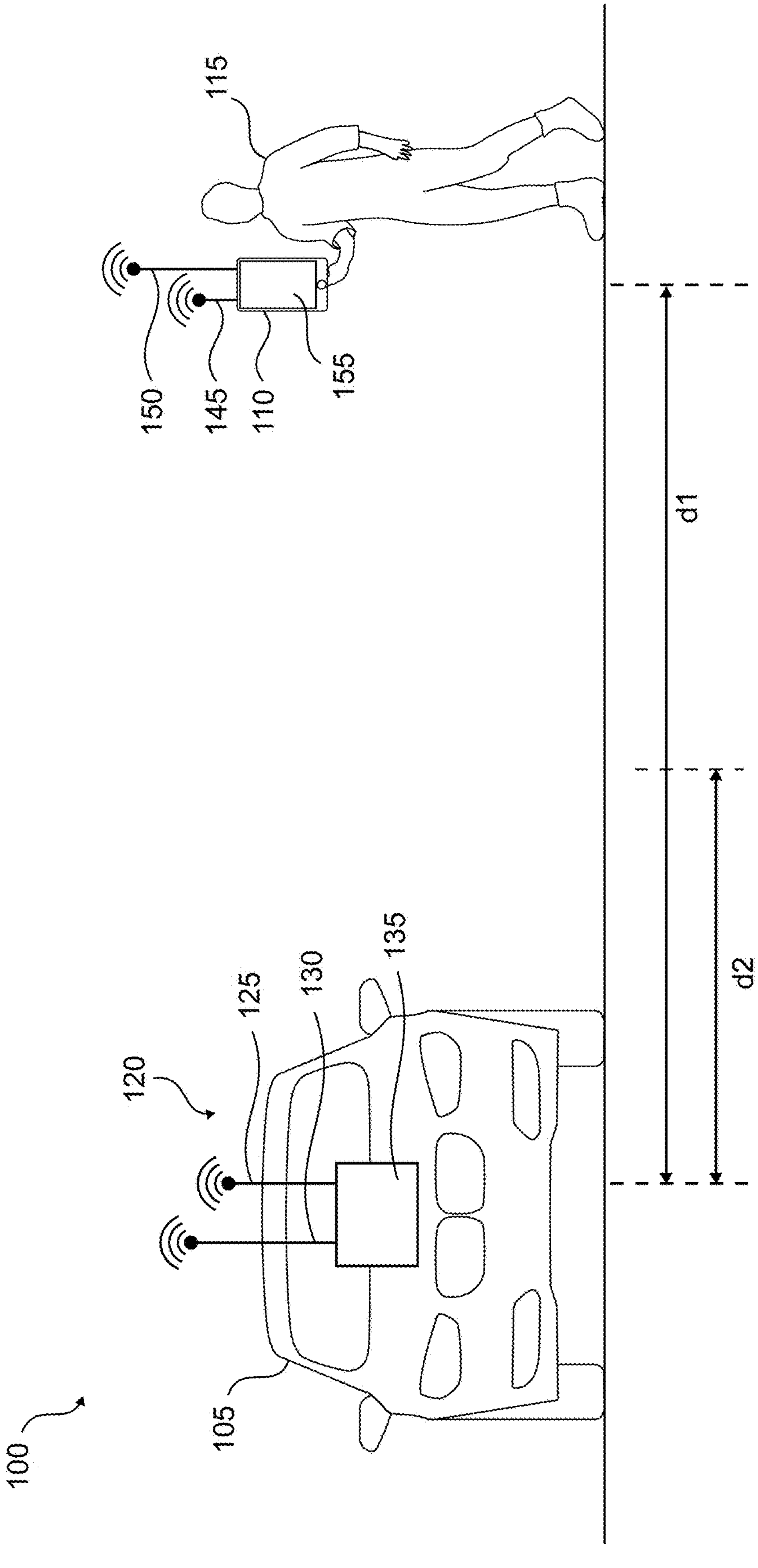
FIG. 1 illustrates a system.

FIG. 1 shows a system 100 that comprises a motor vehicle 105 and a mobile device 110. The mobile device 110 is preferably associated with a person 115 and can comprise, by way of example, a smartphone, a smartwatch, a smartband or a similar device. In other embodiments, the mobile device 110 can also comprise a wearable computer, a laptop computer or a tablet computer. The person 115 may be entitled in the legal sense to use the motor vehicle 105 in a predetermined manner.

Aboard the motor vehicle 105 there is provision for a control apparatus 120. The control apparatus 120 comprises a BLE interface 125, an optional UWB interface 130 and a processing device 135. Correspondingly, the mobile device 110 preferably comprises a BLE interface 145, an optional UWB interface 150 and a processing device 155.

The control apparatus 120 is conditioned to control a predetermined security function of the motor vehicle 105. Moreover, the control apparatus 120 may be conditioned to control a further vehicle function of the motor vehicle 105. Additionally, the control apparatus 120 can be used to interchange data between the motor vehicle 105 and the mobile device 110. To simplify matters, the text hereinbelow refers to the motor vehicle 105 performing a predetermined function if the function is actually provided by the control apparatus 120 aboard the motor vehicle 105. As such, the motor vehicle 105 can communicate with the mobile device 110 by using the control apparatus 120, for example.

The BLE interfaces 125 and 145 are conditioned to set up a communication connection to one another. Both interfaces 125, 145 preferably support BLE at least in version 5, preferably 5.3, more preferably 5.4, even more preferably 6.0 or above. The BLE interfaces 125, 145 can be operated in a Normal Mode, in which a transmission bandwidth of approximately 1 Mbit/s may be available, and a Long Range Mode, in which a smaller bandwidth may be available, but which allows a greater maximum distance between the interfaces 125, 145 to be spanned. In Long Range Mode a bandwidth of approximately 500 Kb/s or approximately 125 Kb/s may be available. The range can be increased inversely proportionally to the available bandwidth.

A distance between the BLE interfaces 125 and 145 can be determined by means of channel sounding. There is provision on at least one interface 125, 145 for multiple endpoints, or transceivers, mounted in a manner spaced apart from one another. To determine distance, a signal can be relayed between each one of the transceivers and the other BLE interface 125, 145 in a predetermined order. Since distances between the spaced-apart transceivers and the receiving interface 125, 145 are different, the receiving interface 125, 145 can determine certain variations in the periods between two successive signals. These periods can be taken as a basis for determining a distance and possibly also a direction of the transmitting BLE interface 125, 145 with respect to the receiving interface 125 145. In a corresponding manner, channel sounding can also be carried out with just one transmitting and multiple receiving transceivers.

The distance can be ascertained by the BLE interface 125 of the control apparatus 120 or by the BLE interface 145 of the mobile device 110. A combined approach in which the distance is ascertained on both sides is likewise possible. It should be noted that channel sounding based on the BLE standard recognizes different variations and the distance can also be determined for a round-trip of a signal, for example, a signal being transmitted between the devices 110, 120 by the control apparatus 120 first in one and then in the other direction.

Another communication connection can be made between the UWB interfaces 130, 150. The UWB connection occupies a large bandwidth in the frequency spectrum but operates at very low signal strengths. A usable bandwidth for information that is to be transmitted and a communication distance are each less than in the case of a BLE connection.

The motor vehicle 105 and the mobile device 110 are preferably conditioned to support a Digital Car Key that can be used to control a security function of the motor vehicle. The making of a communication connection between the motor vehicle 105 and the mobile device 110, a reciprocal authentication and associated processes are comprehensively described in the Digital Car Key standard mentioned herein.

When the person 115 with the mobile device 110 approaches the motor vehicle 105, a communication connection can be made between the BLE interfaces 125 and 145 within a first distance d1. The magnitude of d1 is dependent on circumstances in the area between the motor vehicle 105 and the mobile device 110 and on a protocol, or mode, of the BLE interfaces 125, 145 that is used.

It is proposed that the communication connection between the BLE interfaces 125, 145 first be made in Long Range Mode. Subsequently, channel sounding can be used to determine a distance between the motor vehicle 105 and the mobile device 110. Should the distance be below a predetermined threshold, the BLE interfaces 125, 145 can each be switched to Normal Mode again. The predetermined threshold may be approximately 5 m, preferably approximately 3 m, more preferably approximately 2 m, for example.

It should be noted that the other communication connection between the UWB interfaces 130 and 150 may be possible within a second distance d2. The magnitude of the second distance d2 is likewise dependent on circumstances in the area between the motor vehicle 105 and the mobile device 110.

Figure 2:
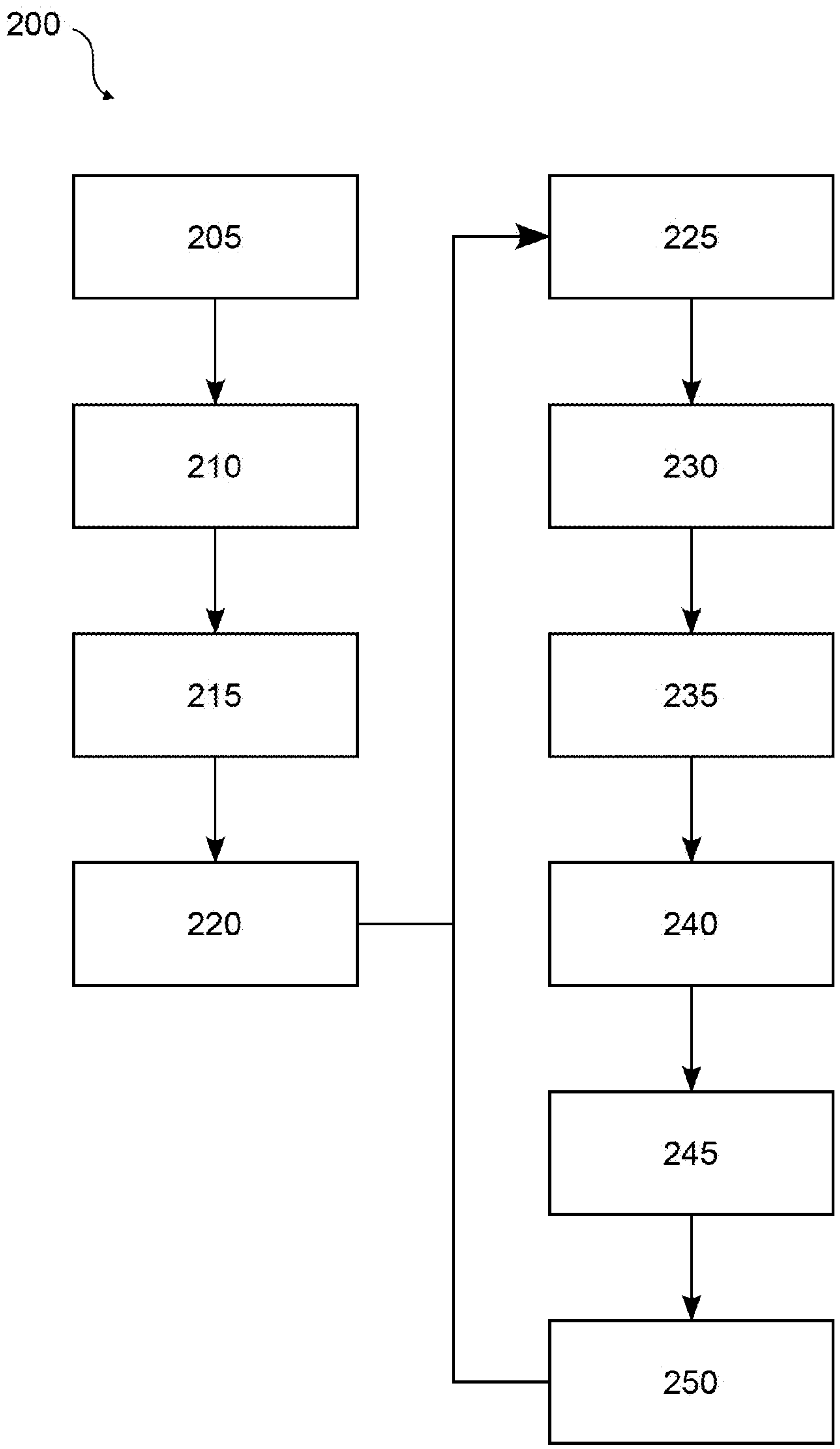
FIG. 2 illustrates a flowchart for a method.

FIG. 2 shows a flowchart for an illustrative method 200 for controlling a security function of a motor vehicle 105. The method 200 is explained by way of illustration with reference to the control apparatus 120, or the motor vehicle 105; a corresponding embodiment with reference to the mobile device 110 is also possible.

In a step 205, the BLE interface 125 of the control apparatus 120 can be configured for Long Range Mode. Correction data can be added to data that are to be transmitted in the physical layer (PHY), so that a receiver that receives the transmitted data only incompletely can carry out a reconstruction.

In a step 210, signals can be regularly transmitted in order to make contact with a receiving BLE interface 145. This process is known as advertising.

In a step 215, the mobile device 110 is in communication range, which means that a communication connection can be made between the BLE interfaces 125 and 145.

In a step 220, there is a first opportunity to carry out an authentication between the motor vehicle 105 and the mobile device 110 by way of the communication connection that has been produced. The authentication may be a prerequisite for controlling a security function of the motor vehicle 105.

In a step 225, a distance between the motor vehicle 105 and the mobile device 110 can be determined by means of channel sounding by way of the communication connection that has been produced between the BLE interfaces 125, 145. This can involve the use of one of several options defined in a BLE standard that both BLE interfaces 125, 145 support. The determined distance and possibly a determined direction of the mobile device 110 relative to the motor vehicle 105 can also be delivered to a different function or a different service aboard the motor vehicle 105. The Digital Car Key, or the security that it provides for the security function, can evaluate the distance and/or the direction.

In a step 230, it is possible to determine whether the determined distance is below a predetermined threshold. The threshold may initially be approximately 5 m, for example. If this is not the case, step 225 can be carried out again.

Otherwise, if the determined distance is below the predetermined threshold, the interfaces 125, 145 can be configured to Normal Mode in a step 235. This can be accomplished, by way of example, by virtue of the BLE interface 125 of the control apparatus 120 transmitting a request to change over the communication connection to Normal Mode to the BLE interface 145 of the mobile device 110, and the BLE interface 145 of the mobile device 110 accepting the request.

In a step 240, both BLE interfaces 125, 145 are configured in Normal Mode. Here, there is a second opportunity to carry out an authentication between the motor vehicle 105 and the mobile device 110. In general, the method 200 can involve producing a communication between the motor vehicle 105 and the mobile device 110 that can be used by any service or any function aboard the motor vehicle 105. The communication connection can be delivered when or after the authentication is carried out.

Optionally, a step 245 can comprise determining an error rate to which data relayed between the interfaces 125 and 145 are subject. The error rate can be considered in particular on the physical layer (PHY layer) before an error correction is carried out. Should the error rate exceed a predetermined threshold, a step 255 can comprise configuring the interfaces 125, 145 to Long Range Mode again. To this end, the interface 125, 145 that ascertains the high error rate can relay a request to change the mode to Long Range, and the other interface 125, 145 can accept the change. More optionally, the threshold for the distance between the motor vehicle 105 and the mobile device 110 that is evaluated in step 230 can be decreased. As such, a predetermined hysteresis can be generated for the changeover between Normal Mode and Long Range. Subsequently, the method 200 can return to step 225 and reiterate.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SIGNS

100 system
105 motor vehicle
110 mobile device
115 person
120 control apparatus
125 BLE interface
130 UWB interface
135 processing device
145 BLE interface
150 UWB interface
155 processing device
d1 first distance
d2 second distance
200 method
205 configure interface for Long Range
210 advertising
215 make connection
220 authentication 1
225 determine distance via BLE channel sounding
230 distance<threshold?
235 configure interface for Normal Mode
240 authentication 2
245 error rate>threshold?
250 configure interface for Long Range, decrease distance threshold

What is claimed is:

1. A method for controlling a security function of a motor vehicle, the method comprising the steps of:

making a communication connection between the motor vehicle and a mobile device via Bluetooth Low Energy Long Range;

determining a distance between the motor vehicle and the mobile device via channel sounding on the communication connection;

changing the communication connection to Bluetooth Low Energy Normal Mode when the distance is below a first predetermined threshold; and when an error rate of the communication connection in Bluetooth Low Energy Normal Mode exceeds a second predetermined threshold, changing the communication connection back to Bluetooth Low Energy Long Range and decreasing the first predetermined threshold.

2. The method according to claim 1, wherein the security function is controlled based on the communication connection of the motor vehicle.

3. The method according to claim 2, wherein a bilateral authentication takes place based on an asymmetric cryptographic method.

4. The method according to claim 2, wherein the security function is controlled based on a Digital Car Key.

5. The method according to claim 2, wherein a further vehicle function of the motor vehicle is controlled.

6. The method according to claim 1, wherein the distance is determined by the motor vehicle; and a request to change the connection to Bluetooth Low Energy Normal Mode is relayed from the motor vehicle to the mobile device.

7. The method according to claim 1, wherein the distance is determined by the mobile device; and a request to change the connection to Bluetooth Low Energy Normal Mode is relayed from the mobile device to the motor vehicle.

8. The method according to claim 1, wherein a request from one of the motor vehicle or mobile device to change the connection to Bluetooth Low Energy Normal Mode is denied by the other of the mobile device or motor vehicle when the determined distance exceeds the first predetermined threshold.

9. A control apparatus for controlling a vehicle function of a motor vehicle, the control apparatus comprising:

a Bluetooth Low Energy interface;

a processing device that is operatively configured to:

configure the interface to Bluetooth Low Energy Long Range;

use the interface to make a communication connection to a mobile device;

determine a distance between the motor vehicle and the mobile device via channel sounding on the communication connection;

change the communication connection to Bluetooth Low Energy Normal Mode when the distance is below a first predetermined threshold; and when an error rate of the communication connection in Bluetooth Low Energy Normal Mode exceeds a second predetermined threshold, change the communication connection back to Bluetooth Low Energy Long Range and decrease the first predetermined threshold.

10. The control apparatus according to claim 9, wherein the processing device is further configured to control the vehicle function based on the communication connection of the motor vehicle.

11. The control apparatus according to claim 10, wherein the processing device is configured to perform a bilateral authentication based on an asymmetric cryptographic method.

12. The control apparatus according to claim 10, wherein the processing device is further configured to control the vehicle function based on a Digital Car Key.

13. The control apparatus according to claim 10, wherein the processing device is further configured to control a further vehicle function of the motor vehicle.

14. The control apparatus according to claim 9, wherein the processing device is further configured to relay a request, from the motor vehicle to the mobile device, to change the connection to Bluetooth Low Energy Normal Mode.

15. The control apparatus according to claim 9, wherein the processing device is further configured to relay a request, from the mobile device to the motor vehicle, to change the connection to Bluetooth Low Energy Normal Mode.

16. The control apparatus according to claim 9, wherein the processing device is further configured to deny a request from the mobile device to change the connection to Bluetooth Low Energy Normal Mode when the distance between the motor vehicle and the mobile device exceeds the first predetermined threshold.

17. The control apparatus according to claim 9, wherein the processing device is further configured to deny a request from the motor vehicle to change the connection to Bluetooth Low Energy Normal Mode when the distance between the motor vehicle and the mobile device exceeds the first predetermined threshold.

18. A motor vehicle comprising a control apparatus according to claim 9.

19. A mobile device for controlling a vehicle function of a motor vehicle, the mobile device comprising:

a Bluetooth Low Energy interface;

a processing device that is operatively configured to:

configure the interface to Bluetooth Low Energy Long Range;

use the interface to make a communication connection to the motor vehicle;

determine a distance between the mobile device and the motor vehicle via channel sounding on the communication connection;

change the communication connection to Bluetooth Low Energy in Normal Mode when the distance is below a first predetermined threshold; and when an error rate of the communication connection in Bluetooth Low Energy Normal Mode exceeds a second predetermined threshold, change the communication connection back to Bluetooth Low Energy Long Range and decrease the first predetermined threshold.

* * * * *